United States Patent
Gurumoorthy et al.

(10) Patent No.: US 6,868,507 B1
(45) Date of Patent: Mar. 15, 2005

(54) OPERATING SYSTEM INDEPENDENT

(75) Inventors: Nagasubramanian Gurumoorthy, Hillsboro, OR (US); Raul Yanez, Phoenix, AZ (US); Mark J. Sullivan, Tempe, AZ (US); Javier A. Galindo, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 551 days.

(21) Appl. No.: 09/708,205

(22) Filed: Nov. 7, 2000

(51) Int. Cl.[7] .................... G06F 11/00; G06F 15/177
(52) U.S. Cl. .................. 714/25; 714/36; 713/1
(58) Field of Search .................. 714/5, 8, 25, 36; 713/1, 2

(56) References Cited

U.S. PATENT DOCUMENTS

| | | | | |
|---|---|---|---|---|
| 5,396,619 A | * | 3/1995 | Walton ..................... | 714/8 |
| 6,101,617 A | * | 8/2000 | Burckhartt et al. ......... | 714/23 |
| 6,189,114 B1 | * | 2/2001 | Orr ........................ | 714/25 |
| 6,253,163 B1 | * | 6/2001 | Lapie ..................... | 702/183 |
| 6,415,383 B1 | * | 7/2002 | Colegrove et al. ......... | 713/2 |
| 6,505,144 B2 | * | 1/2003 | Lapie ..................... | 702/183 |
| 6,516,427 B1 | * | 2/2003 | Keyes et al. .............. | 714/25 |
| 6,598,173 B1 | * | 7/2003 | Sheikh et al. ............. | 714/4 |
| 6,606,716 B1 | * | 8/2003 | Vrhel et al. .............. | 714/32 |
| 6,665,778 B1 | * | 12/2003 | Assaf ..................... | 711/156 |
| 6,691,195 B1 | * | 2/2004 | Aguilar et al. ............ | 710/260 |
| 6,766,474 B2 | * | 7/2004 | Schelling ................. | 714/36 |
| 2003/0105948 A1 | * | 6/2003 | Kikinis et al. ............ | 713/1 |

OTHER PUBLICATIONS

Intel Corporation, Version 0.99, Apr. 19, 2000, Extensible Firmware Interface Specification, pp. 1–334.

* cited by examiner

*Primary Examiner*—Scott Baderman
*Assistant Examiner*—Anne L. Damiano
(74) *Attorney, Agent, or Firm*—Robert A. Greenberg

(57) ABSTRACT

A system and method of using of diagnostic procedures through a firmware interface in a processing system are described. A first physical area of a memory may store one or more diagnostic modules comprising machine-readable instructions for performing one or more diagnostic procedures of a processing system. A second physical area of the memory may store an operating system capable of initiating execution of the one or more diagnostic procedures through the firmware interface.

39 Claims, 3 Drawing Sheets

OPERATING SYSTEM INDEPENDENT

BACKGROUND

1. Field

Systems and method described herein relate to diagnostics in a processing system. In particular, these systems and method relate to the use of software for performing diagnostic procedures.

2. Background Information

Software tools for performing diagnostic procedures enable diagnostic tests on one or more elements of a processing system. Such elements of a processing system to be diagnosed may include hardware subsystems such as, for example, memory devices, communication circuitry and data busses. Diagnostic tools may also be used to performing tests of software subsystems. Application programs may typically initiate diagnostic procedures through the diagnostic tools.

Software diagnostic tools are typically hosted on an operating system which resides on a target processing system to be tested. In a desktop or mobile computing environment, for example, software diagnostic tools may be hosted on an operating systems such as versions of Windows™ sold by Microsoft Corporation. One set of software diagnostic tools may typically be developed for several processing systems hosting the same operating system.

With the use of multiple types of operating systems in, for example, embedded and real-time computing platforms, hosting similar diagnostic software tools on each of several operating systems typically involves the use of a different set of diagnostic tools for each operating system. Accordingly, performing similar diagnostic tests on multiple systems with different operating systems typically involves developing a set of diagnostic tools for each operating system. There is a need to reduce the cost and complexity associated with providing diagnostic tools for processing systems hosting different operating systems.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Embodiments of the present invention relate to the use of diagnostic procedures through a firmware interface in a processing system. A first physical area of a memory may store one or more diagnostic modules comprising machine-readable instructions for performing one or more diagnostic procedures. A second physical area of the memory may store an operating system capable of initiating execution of the one or more diagnostic procedures through the firmware interface.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

A "processing system" as discussed herein refers to a combination of hardware and software resources for accomplishing computational tasks. An "operating system" as discussed herein relates to one or more encoded procedures for facilitating communication between application procedures and processing resources of a processing system. Such an operating system may allocate processing resources to application procedures and provide an application programming interface (API) comprising callable software procedures for execution on the processing resources in support of application procedures. However, embodiments of the present invention are not limited in this respect. A "basic input/output system" (BIOS) refers to systems for providing machine-readable instructions ("BIOS routines") to a processing system processor for initializing hardware resources of a processing system.

A "firmware interface" refers to software routines and data structures to enable communication between an operating system and hardware resources of a processing system. Such a firmware interface may define an interface between the hardware resources of a processing system and for one or more or more independently developed operating systems. However, embodiments of the present invention are not limited in this respect and other implementations of a firmware interface may be used. According to an embodiment, BIOS routines may be executed on hardware resources to install the software routines and data structures of a firmware interface on hardware resources of a processing system and then subsequently install an operating system during a boot sequence. However, embodiments of the present invention are not limited in this respect.

Figure 1:
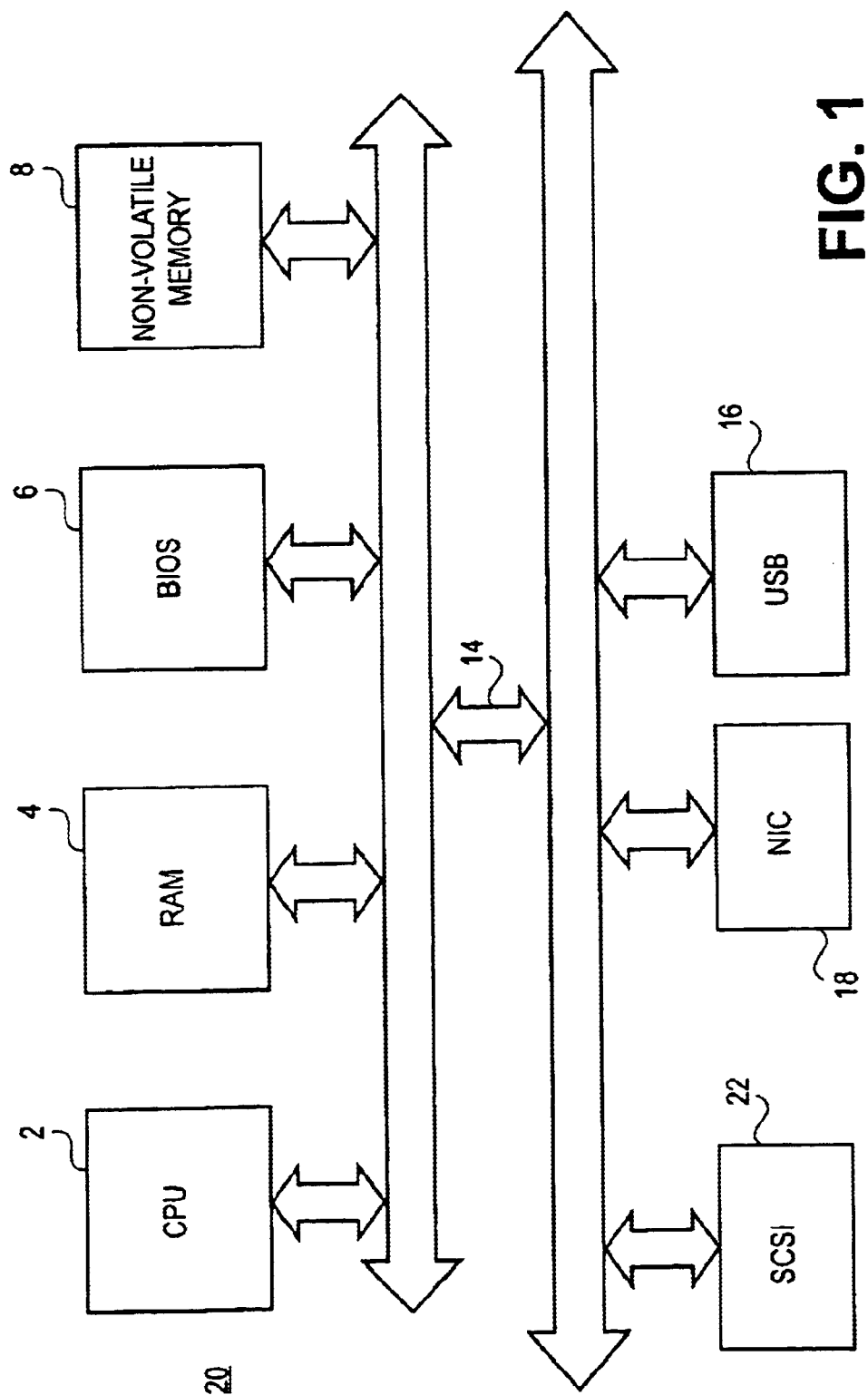
FIG. 1 is a schematic diagram illustrating a computer architecture according to an embodiment of the present invention.

FIG. 1 is a schematic diagram illustrating a computer architecture 20 according to an embodiment of the present invention. A central processing unit (CPU) 2 is coupled through a bus 10 to a random access memory (RAM) 4, basic input/output system (BIOS) and a non-volatile memory (NVM) 8 such as a hard disk drive or flash memory device. Devices on the bus 10 may also be coupled to one or more peripheral devices such as a network interface controller (NIC) 14, universal serial bus (USB) 16 and small computer system interface (SCSI) 22 through a bridge 14 and a bus 12. Embodiments of the present invention are not limited to this architecture and other architectures may be used. Also, the busses 10 and 12 may be any suitable communication bus such as a peripheral components interconnection (PCI) bus. However, embodiments of the present invention are not limited in this respect and other busses may be used.

A "diagnostic procedure" as referred to herein relates to procedures executed on a processing system to evaluate a hardware or software subsystem. Such a hardware or software subsystem to be evaluated may comprise portions of the processing system executing the procedure. In the embodiment of the FIG. 1, for example, a diagnostic procedure may be directed to evaluating devices and related software subsystems such as, for example, either of the busses 10 or 12, the SCSI 22, NIC 14, NVM 8 and USB 16.

However, embodiments of the present invention are limited in this respect. For example, the system to be evaluated by a diagnostic procedure may not be a part of the processing system executing the diagnostic procedure. For example, a diagnostic procedure may be executed to evaluate a device coupled to the processing system through a network. In any case, embodiments of the present invention are not limited in these respects.

A "system memory" of the presently illustrated embodiment may comprise portions of the RAM 4 and NVM 8 to provide memory resources for use during dynamic operation of the processing system. A "diagnostic module" as referred to herein relates to a set of machine-readable instructions for executing one or more diagnostic procedures on a processing system. Such diagnostic modules may be stored in one or more areas of the system memory.

In the illustrated embodiment, the BIOS 6 may comprise a memory for storing BIOS routines to be executed on the CPU 2 during a boot sequence. Execution of the BIOS routines may initiate the loading of a firmware interface from the BIOS 6 or NVM 8 to the RAM 4, followed by the loading of an operating system from the NVM 8 to the RAM to create an image in the system memory. Following the boot procedure, the firmware interface may provide pointers to locations in the system memory to direct the CPU 2 to execute instructions in the image for performing tasks. However, embodiments of the present invention are not limited in this respect and a firmware interface and operating system may be loaded to a system memory using other techniques.

Such an operating system loaded to the RAM 4 during a boot procedure may comprise, for example, any one of several operating systems for desktop or mobile computers such as, for example, versions of Windows™ sold by Microsoft Corporation, or any one of several operating systems for real-time applications such as, for example, versions of Linux or versions of VxWorks or pSOS sold by Windriver Systems, Inc. However, embodiments of the present invention are limited in this respect and other operating systems may be used.

Figure 2:
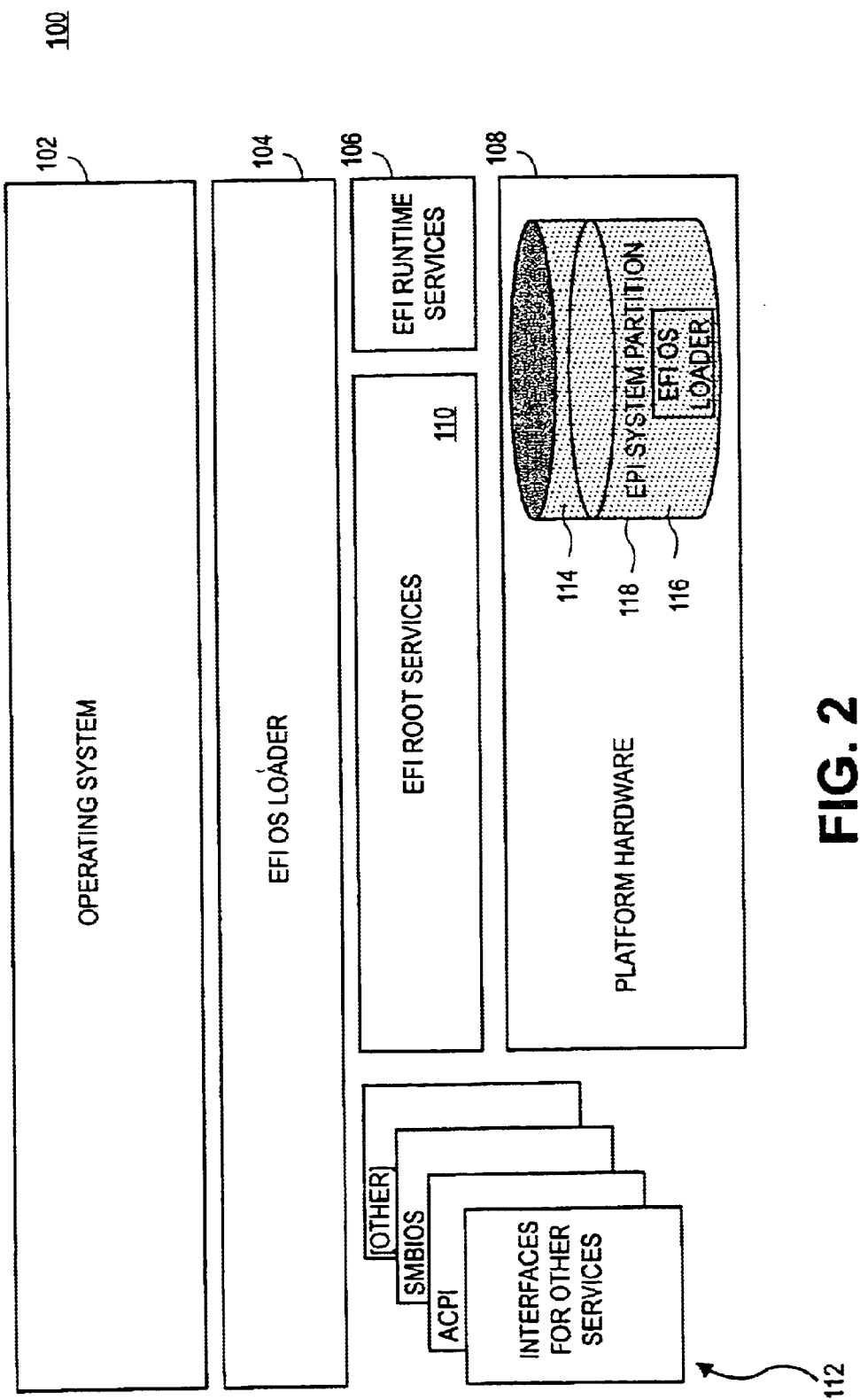
FIG. 2 is a schematic diagram illustrating a software configuration comprising a firmware interface according to an embodiment of the present invention.

FIG. 2 is a schematic diagram illustrating a software configuration comprising a firmware interface according to an embodiment of the present invention. In the illustrated embodiment, a boot procedure may install a firmware interface such as an extensible firmware interface (EFI) as described in the Extensible Firmware Interface Specification, Version 0.99, Apr. 19, 2000 published by Intel Corporation (hereinafter "EFI Specification"). However, embodiments of the present invention are not limited in this respect and other firmware interfaces may be used.

In the illustrated embodiment, an operating system may communicate with platform hardware 108 through an EFI or interfaces 112 for other services such as, for example, an Advanced Configuration and Power Interface (ACPI), ACPI Specification, Revision 1.0, Dec. 22, 1996, Intel Corp., Microsoft Corp. and Toshiba Corp., and System Management BIOS (SMBIOS), SMBIOS Reference Specification Version 2.3.1, Mar. 16, 1999. However, embodiments of the present invention are not limited in this respect and the operating system may communicate with system hardware using other techniques. EFI runtime services 106 may include diagnostic modules which may be executed in response to the operating system 102 via the EFI.

The platform hardware 108 comprises a system memory 118 which is capable of storing executable images of the operating system 102 and the EFI. In the illustrated embodiment, the EFI runtime services 106 and EFI operating system loader 104 reside in a first area 116 of the system memory 118 and the operating system 102 resides in a second area 114 of the system memory 118. While FIG. 2 shows that first and second areas 116 and 114 of the system memory 118 are contiguous, it should be understood by those of ordinary skill in the art that such areas of memory need not be physically contiguous in the system memory 118. It should be understood that locations internal to the area 116 need not be contiguous in the system memory 118.

According to an embodiment, BIOS routines may load the EFI runtime services 106 and EFI boot services 110 to the system memory 118 separately from a process for loading of the operating system 102. However, embodiments of the present invention are not limited in this respect. The operating system 102 may initiate the execution of the diagnostic modules in the EFI runtime services 106 through a firmware interface. Once loaded to the system memory 118, the operating system 102 may initiate execution of the diagnostic modules.

In the illustrated embodiment, an "EFI System Table" may be maintained in conjunction with the firmware interface to provide a reference to EFI run time services 106. The EFI System table may maintain a list of globally unique identifiers (GUIDs) referenced to function pointers. Accordingly, the operating system 102 may retrieve function pointers to the runtime services 106 using the GUIDs. However, embodiments of the present invention are not limited in this respect and pointers to runtime functions may be located using other techniques.

Figure 3:
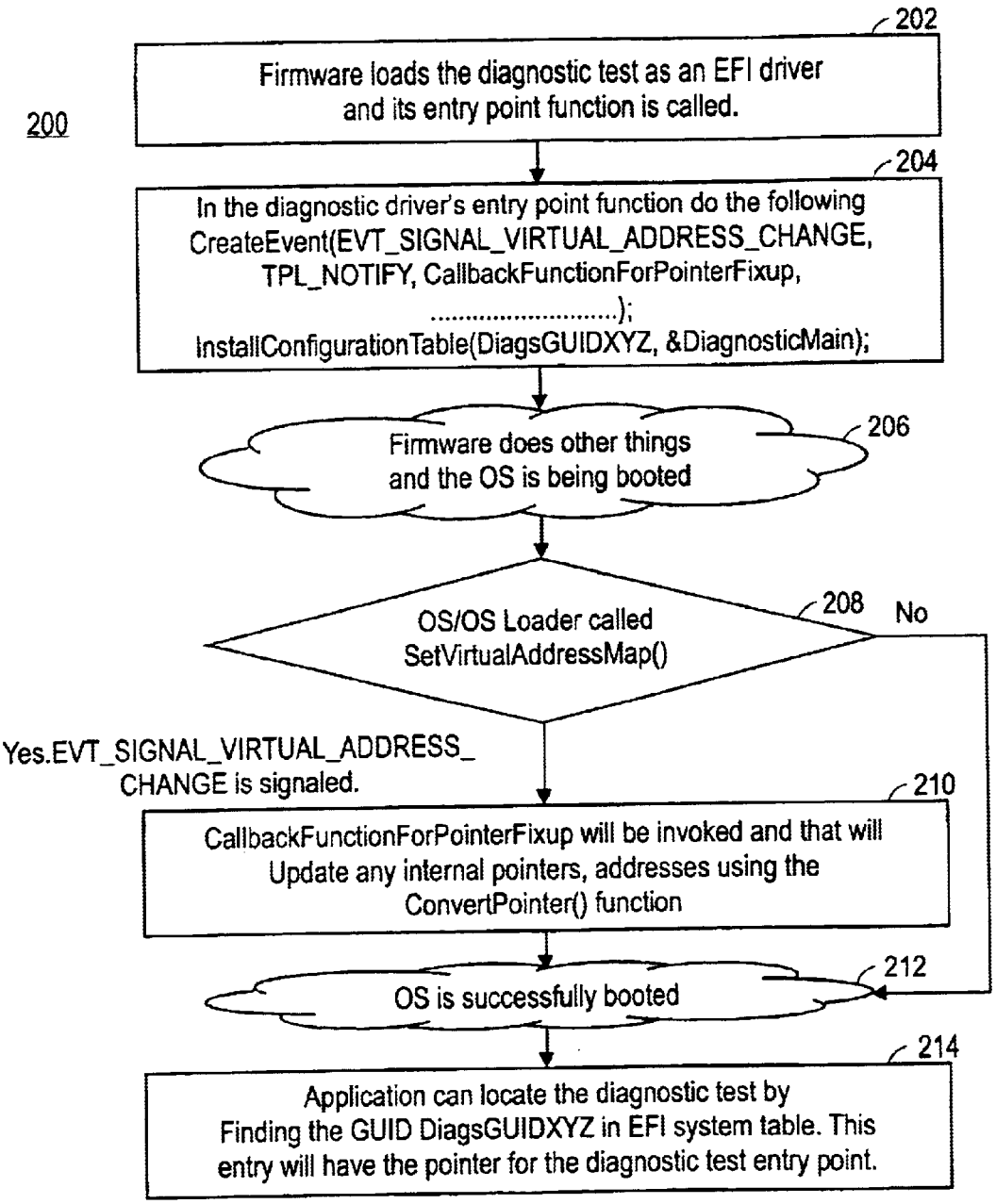
FIG. 3 is flow diagram illustrating a process of loading run-time diagnostic modules to a processing system according to an embodiment of the present invention.

FIG. 3 is a flow diagram illustrating a process of loading run-time diagnostic modules to a processing system according to an embodiment of the present invention. In the illustrated embodiment, BIOS routines may include a boot manager for loading EFI drivers as illustrated in the EFI Specification at Section 2.1. The boot manager may install the diagnostic modules at a first area of system memory as illustrated with reference to blocks 202 and 204. However, embodiments of the present invention are limited in this respect and the diagnostic modules may be loaded to the system memory using other techniques. At blocks 202, the boot manager loads one or more diagnostic modules as one or more EFI drivers. The boot manager may load these EFI drivers as illustrated in the EFI Specification in Section 4.5. This may then load the EFI drivers in a first region of the system memory.

At block 204, an EFI_IMAGE_ENTRY_POINT function may identify an event "EVT_SIGNAL_VIRTUAL_ADDRESS_CHANGE" by executing a CreateEvent function (described in the EFI Specification at Section 3.1.1) for detecting changes in virtual addressing. Upon detection of this event, a function "CallbackFunctionForPointerFixup" may be invoked to account for changes in the virtual addressing of the diagnostic modules in system memory. A configuration table with pointers identifying the locations of the diagnostic modules in system memory referenced by GUIDs may then be created as part of the EFI system table by executing InstallConfigurationTable as described in the EFI Specification at Section 3.8.6. However, embodiments of the present invention are not limited in this respect and other techniques may be used for organizing diagnostic modules in system memory and detecting changes in virtual addressing.

Cloud 206, diamond 208 and block 210 illustrate a process of loading an operating system to a second area of the system memory which may be distinct from the first area of the system memory where the diagnostic modules are to reside. However, embodiments of the present invention are not limited in this respect and other techniques for loading an operating system may be used. At cloud 206, the boot manager may perform additional procedures following installation of the EFI drivers such as, for example, installing an operating system in the system memory through an operating system loader. In the illustrated embodiment, execution of the operating system loader at diamond 208 may invoke a procedure SetVirtualAddressMap for transitioning to a virtual address mode as described in the EFI Specification at 3.7.1. However, embodiments of the present invention are not limited in this respect and an operating system loader in an alternative embodiment may not necessarily perform such a transition to a virtual address mode.

Invocation of the function SetVirtuaLAddressMap at diamond 208 may generate the aforementioned event EVT_SIGNAL_VIRTUAL_ADDRESS to indicate a transition to virtual addressing mode. This may then invoke the function CallbackFunctionForPointerFixup at block 210 to change the pointers to the diagnostic modules in the configuration table to be consistent with changes in virtual addressing. This may be accomplished by, for example, executing a ConvertPointer function as described in the EFI Specification at Section 3.7.2. However, embodiments of the present invention are not limited in this respect and other methods of accounting for changes to a virtual addressing scheme may be used.

Following completion of installation of the operating system at cloud 212, application programs may then execute a diagnostic module through the operating system and firmware interface at block 214. In the illustrated embodiment, this may be accomplished by calling a StartImage function specifying an EFI_HANDLE in the configuration table pointing to the diagnostic module as described in the EFI Specification at Section 3.4.2. However, embodiments of the present invention are limited in this respect and application programs may execute diagnostic modules through a firmware interface using other techniques.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:

in a physically addressable area of a system memory, storing one or more diagnostic modules comprising machine-readable instructions for performing one or more diagnostic procedures of a processing system in response to a boot sequence to initialize the processing system;

loading machine-readable instructions to the system memory in response to the boot sequence for providing an operating system capable of addressing the system memory; and inhibiting the operating system from remapping the machine-readable instructions stored in the system memory for performing the one or more diagnostic procedures.

2. The method of claim 1, wherein the one or more diagnostic modules comprise run-time drivers executable through a firmware interface.

3. The method of claim 1, wherein the diagnostic procedures comprise diagnostic procedures for testing one or more peripheral devices of the processing system.

4. The method of claim 1, the method further comprising:

loading the one or more diagnostic modules to a first physically addressable area of the system memory; and loading the operating system to a second physically addressable area of the system memory from a non-volatile memory device.

5. The method of claim 4, the method further comprising loading the one or more diagnostic modules to the first physically addressable area of the system memory from a basic input/output system (BIOS).

6. The method of claim 1, the method further comprising:

maintaining pointers in a firmware interface to the diagnostic modules at an addressable portion of the system memory; and converting pointers in the firmware interface in response to a change in virtual addressing by the operating system.

7. An apparatus comprising:

processing system comprising a memory;

logic to store in a physically addressable area of the memory one or more diagnostic modules comprising machine-readable instructions for performing one or more diagnostic procedures of a processing system in response to a boot sequence to initialize the processing system;

logic to load machine-readable instructions of an operating system to the memory in response to the boot sequence, the operating system being capable of initiating execution of the one or more diagnostic procedures on the processing system; and logic to inhibit the operating system from remapping the machine-readable instructions for performing the one or more diagnostic procedures from the physically addressable area.

8. The apparatus of claim 7, wherein the one or more diagnostic modules comprise run-time drivers executable by the operating system through a firmware interface.

9. The apparatus of claim 7, wherein the diagnostic procedures comprise diagnostic procedures for testing one or more peripheral devices of the processing system.

10. The apparatus of claim 7, the apparatus further comprising:

logic to load the one or more diagnostic modules to a first physically addressable area of the memory; and logic to load the operating system to a second physically addressable area of the memory from a non-volatile memory device.

11. The apparatus of claim 10, the apparatus further comprising a basic input/output system (BIOS) comprising logic to load the one or more diagnostic modules to the first physically addressable area of the memory.

12. The apparatus of claim 7, the apparatus further comprising:

logic to maintain pointers in a firmware interface to the diagnostic modules at an addressable portion of the storage medium; and logic to convert pointers in the firmware interface in response to a change in virtual addressing by the operating system.

13. A circuit for initiating a boot sequence for a processing system, the circuit comprising:
   logic to store in a physically addressable area of a storage medium one or more diagnostic modules comprising machine-readable instructions for performing one or more diagnostic procedures of a processing system in response to the boot sequence;
   logic to store machine-readable instructions of an operating system in the storage medium in response to the boot sequence, the operating system being capable of addressing the storage medium; and
   logic to inhibit the operating system from remapping the machine-readable instructions for performing the one or more diagnostic procedures in the storage medium.

14. The circuit of claim 13, wherein the circuit comprises a basic input/output system (BIOS) adapted to integrate with the processing system.

15. The circuit of claim 13, wherein the one or more diagnostic modules comprise run-time drivers executable by the operating system through a firmware Interface.

16. The circuit of claim 13, wherein the diagnostic procedures comprise diagnostic procedures for testing one or more peripheral devices of the processing system.

17. The circuit of claim 13, the circuit further comprising:
   logic to load the one or more diagnostic modules to a first physically addressable area of the storage medium; and
   logic to load the operating system to a second physically addressable area of the storage medium from a non-volatile memory device.

18. The circuit of claim 17, the circuit further comprising a basic input/output system (BIOS) comprising logic to load the one or more diagnostic modules to the first physically addressable area of the storage medium.

19. The circuit of claim 13, the circuit further comprising:
   logic to maintain pointers in the firmware interface to the diagnostic modules at an addressable portion of the storage medium; and
   logic to convert pointers In the firmware interface in response to a change in virtual addressing by the operating system.

20. An article comprising:
   a storage medium comprising machine-readable Instructions stored thereon for:
      initiating storage of machine-readable instructions for performing one or more diagnostic procedures of a processing system in a first physical area of a memory in response to a boot sequence to initialize the processing system;
      initiating storage of machine-readable instructions for executing an operating system for the processing system in a second physical area of the memory in response to the boot sequence; and
      inhibiting the operating system from remapping the machine readable instructions for performing the one or more diagnostic procedures in the first physical area of the memory.

21. The article of claim 20, wherein the one or more diagnostic modules comprise run-time drivers executable by the operating system through a firmware interface.

22. The article of claim 20, wherein the diagnostic procedures comprise diagnostic procedures for testing one or more peripheral devices of the processing system.

23. The article of claim 20, wherein the storage medium further comprises machine readable instructions stored thereon for loading the one or more diagnostic modules to the physically area of the memory from a basic input/output system (BIOS).

24. The article of claim 20, wherein the storage medium further comprises machine-readable instructions stored thereon for:
   maintaining pointers in a firmware interface to the diagnostic modules at an addressable portion of the memory; and
   converting pointers in the firmware interface in response to a change in virtual addressing by the operating system.

25. A method comprising:
   in a storage medium, storing one or more diagnostic modules comprising machine-readable instructions for performing one or more diagnostic procedures of a processing system;
   hosting an operating system capable of addressing the storage medium, wherein the operating system is capable of initiating execution of the one or more diagnostic procedures through a firmware interface;
   maintaining pointers in the firmware interface to the diagnostic modules at an addressable portion of the storage medium; and
   converting pointers in the firmware interface in response to a change in virtual addressing by the operating system.

26. The method of claim 25, wherein the one or more diagnostic modules comprise run-time drivers executable through the firmware interface.

27. The method of claim 25, wherein the diagnostic procedures comprise diagnostic procedures for testing one or more peripheral devices of the processing system.

28. The method of claim 25, the method further comprising:
   loading the one or more diagnostic modules to a first physically addressable area of the storage medium; and
   loading the operating system to a second physically addressable area of the storage medium.

29. The method of claim 28, the method further comprising loading the one or more diagnostic modules to the physically addressable area of the storage medium from a basic input/output system (BIOS).

30. An apparatus comprising:
   a processor;
   a memory to store data;
   logic to store in the memory one or more diagnostic modules comprising machine-readable instructions for performing one or more diagnostic procedures of a processing system;
   an operating system capable of initiating execution of the one or more diagnostic procedures on the processor through a firmware interface;
   logic to maintain pointers in the firmware interface to the diagnostic modules at an addressable portion of the storage medium; and
   logic to convert pointers in the firmware interface in response to a change in virtual addressing by the operating system.

31. The apparatus of claim 30, wherein the one or more diagnostic modules comprise run-time drivers executable through the firmware interface.

32. The apparatus of claim 30, wherein the diagnostic procedures comprise diagnostic procedures for testing one or more peripheral devices of the processing system.

33. The apparatus of claim 30, the apparatus further comprising:
   logic to load the one or more diagnostic modules to a first physically addressable area of a system memory; and logic to load the operating system to a second physically addressable area of the system memory from a non-volatile memory device.

34. The apparatus of claim 33, the apparatus further comprising a basic input/output system (BIOS) comprising logic to load the one or more diagnostic modules to the first physically addressable area of the system memory.

35. An article comprising:
a storage medium comprising machine-readable instructions stored thereon for:
   initiating storage of machine-readable instructions for performing one or more diagnostic procedures of a processing system in a first physical area of a memory;
   initiating storage of machine-readable instructions for executing an operating system for the processing system In a second physical area of the memory, wherein the operating system is capable of initiating execution of the one or more diagnostic procedures through a firmware interface;
   maintaining pointers in the firmware interface to the diagnostic modules at an addressable portion of the memory; and
   converting pointers in the firmware interface in response to a change in virtual addressing by the operating system.

36. The article of claim 35, wherein the one or more diagnostic modules comprise run-time drivers executable through the firmware interface.

37. The article of claim 35, wherein the diagnostic procedures comprise diagnostic procedures for testing one or more peripheral devices of the processing system.

38. The article of claim 35, wherein the storage medium further comprises machine readable instructions stored thereon for:
   loading the one or more diagnostic modules to a first physically addressable area of the memory; and
   loading the operating system to a second physically addressable area of the memory from a non-volatile memory device.

39. The article of claim 35, wherein the storage medium further comprises machine readable instructions stored thereon for loading the one or more diagnostic modules to the physically addressable area of the system memory from a basic input/output system (BIOS).

* * * * *

UNITED STATES PATENT AND TRADEMARK OFFICE
CERTIFICATE OF CORRECTION

PATENT NO. : 6,868,507 B1
DATED : March 15, 2005
INVENTOR(S) : Gurumoorthy et al.

It is certified that error appears in the above-identified patent and that said Letters Patent is hereby corrected as shown below:

Column 2,
Line 46, after "(BIOS)", insert -- 6 --.

Signed and Sealed this

Twenty-fourth Day of May, 2005

JON W. DUDAS
*Director of the United States Patent and Trademark Office*